Sept. 30, 1969    J. D. AINSWORTH    3,470,442
CONTROL SYSTEMS FOR H.V.D.C. TRANSMISSION LINKS
Filed July 3, 1967    7 Sheets-Sheet 4

3,470,442
CONTROL SYSTEMS FOR H.V.D.C. TRANSMISSION LINKS
John Desmond Ainsworth, Stafford, England, assignor to the English Electric Company Limited, London, England, a British company
Filed July 3, 1967, Ser. No. 650,938
Claims priority, application Great Britain, July 5, 1966, 30,217/66
Int. Cl. H02m 3/22, 5/40
U.S. Cl. 321—2                    11 Claims

ABSTRACT OF THE DISCLOSURE

A control system for an H.V.D.C. link including two A.C.–D.C. converter stations operable as a rectifier and an invertor, respectively. At least one local controller is provided at each station for adjusting the conduction angles of the controllable devices, e.g. mercury pool valves, so as to adjust a quantity, e.g. power, of the link in dependence on the difference between a signal derived from the link itself and an "ordered" signal from a master controller. In addition, the invertor station includes an additional control operative to reduce the magnitude of the ordered signal whereby to afford a margin by which the invertor tends to adjust the said quantity in the link to a value lower than that adjusted by the rectifier. The system affords an extremely rapid response to changes in the monitored quantity, any such change being sensed directly by the master controller which, in turn, appropriately governs the local controllers.

---

This invention relates to a control system for a high voltage direct current transmission link.

From one aspect, the present invention consists in a control system for an H.V.D.C. transmission link including two converter stations each including controllable devices and operable as a rectifier and an invertor, respectively, comprising a local controller at each station for governing the conduction angles of said devices whereby to adjust a first quantity of the transmission link in dependence on the difference between a first signal proportional to said quantity derived from the link, and a second signal, a master controller for developing said second signal as the difference between a third signal proportional to a second quantity and a fourth signal proportion to a desired value of said second quantity, said second signal being applied in common to each local controller, and means for reducing said second signal at the invertor whereby to afford a margin by which said invertor tends to adjust the first quantity to a value lower than that adjusted by the rectifier.

The controllable devices may comprise mercury pool valves or thyristors.

The first and second quantities may be the same as, or different from, one another.

The said second signal may be transmitted to both of the local controllers through telecommunication links, or, for the case in which the master controller is situated at one of the terminal stations, a telecommunication link need only be employed for the transmission of the second signal to the "distant" station.

This second signal may be coded at the master controller for transmission, and it may conveniently be proportional to a binary-coded number representative of the states of a reversible counter in which the number registered therein is adjustable by a clock pulse generator, the number increasing upon the difference between the said third and fourth signals being greater than a predetermined value and decreasing upon the difference between the said signals being less than a predetermined value. Further, the pulse repition frequency of the said generator may be a function of this difference.

The H.V.D.C. link may be bi-polar, in which case a local controller is associated with the rectifier and the invertor stations in each pole, a single master controller however being operable to control all the local controllers in common. Alternatively, auxiliary master controllers may additionally be introduced for each pole, the single master controller referred to then being operable to control the two auxiliary master controllers whilst these auxiliary controllers control the local controllers associated with each pole at both the rectifier and the invertor stations.

The principal advantage possessed by this invention over previous systems is that, with such systems, should the A.C. voltage at the rectifier station fall, then the monitored quantity of the link, e.g. current, will fall and the correct current value is usually restored by the operation of tap-changers which increase the A.C. voltage. However, this mode of correction is necessarily slow in action thus giving rise to a substantial error in the D.C. current during the period of correction. On the other hand, with a control system according to this invention, any change in the monitored quantity, e.g. D.C. current or power, is sensed by the master controller which governs the local controller in such a manner as to restore this quantity to the desired value substantially instantaneously.

In order that the invention may be fully understood, some embodiments thereof will now be described, by way of example, with reference to the accompanying drawings, in which.

Figure 1:
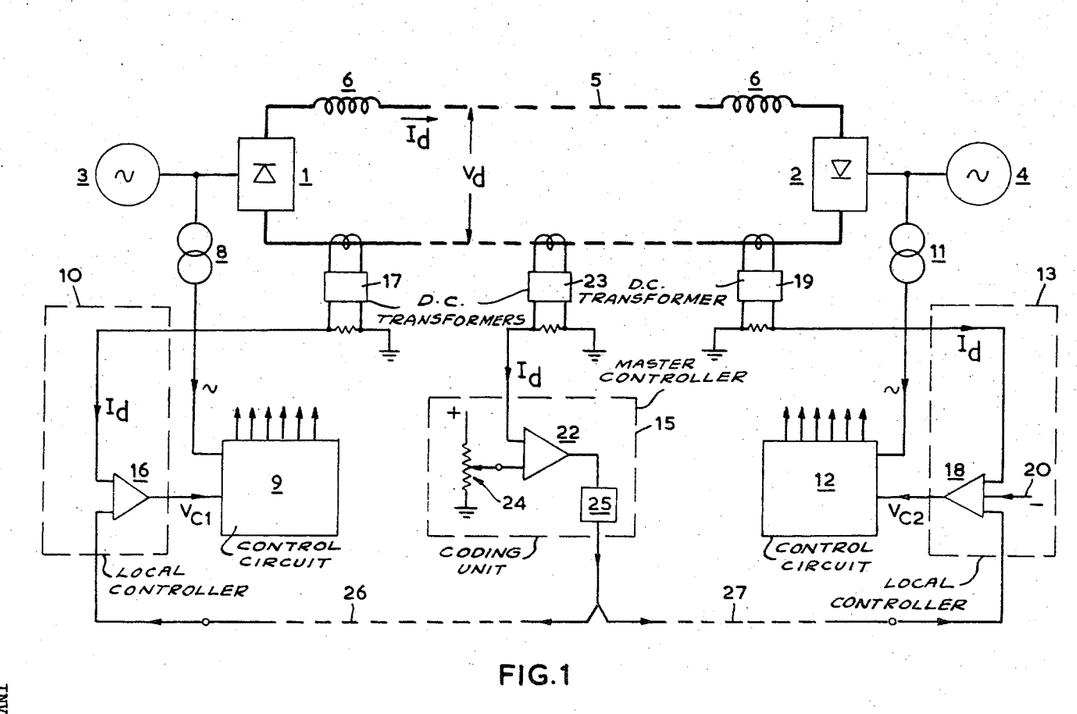
FIGURE 1 illustrates an H.V.D.C. link incorporating a "constant current" control system according to this invention.

Referring now to FIGURE 1 there is shown a high voltage direct current transmission link comprising two convertors 1 and 2, the convertor 1 being supplied from an A.C. system 3 and operating as a rectifier and the convertor 2 being operated as an invertor and supplying an A.C. system 4. The convertors are each connected to a D.C. line 5 through smoothing reactors 6.

A voltage transformer 8 supplies a grid control circuit 9 for the controlled devices, e.g. valves, in converter 1, the phase of the grid firing pulses, in relation to the phase of the A.C. system 3, being controlled by a "local" controller 10, and similarly a transformer 11 supplies a grid control circuit 12 for the valves in convertor 2, the relative phase of these pulses being controlled by a "local" controller 13.

The delay of the firing angle $\alpha$, that is the amount, in electrical degrees, by which the instant of firing any particular valve is delayed following the instant of natural commutation of the valve, is linearly proportional to the voltages $V_{C1}$, $V_{C2}$ from the controllers, or is at least progressively controlled by these voltages, the D.C. output voltage $V_d$ from the convertor being proportional to $\cos \alpha$ and having a maximum positive value at $\alpha=0$ (full rectification) which decreases through zero, $\alpha=90°$, to negative values (inversion) as $\alpha$ increases towards 180°. In practice, the controllers are designed so as to restrict $\alpha$ to a value below 180° in order to allow a margin angle $\alpha$ during which the valve may de-ionise and thus avoid commutation failure, and in this respect the controllers may include circuits such as those described in our co-pending patent application No. 636,396 filed May 5, 1967.

Each local controller 10, 13 derives its control voltage output $V_{C1}$, $V_{C2}$ in dependence on a proportion of the actual D.C. line current and an ordered current I from a master controller 15.

More particularly, the local controller 10 includes a high-gain D.C. amplifier 16 which is supplied with a resultant input signal proportional to the difference between the input from the master controller 15 and an input, proportional to the line current $I_d$ from a D.C. current transformer 17. Similarly, the local controller 13 includes an amplifier 18 which is supplied with an input signal proportional to the difference between the input from the controller 15 and an input from a D.C. current transformer 19, the resultant signal however, being modified by a D.C. voltage applied to terminal 20 which is such as to reduce the ordered current I from the controller 15 by an amount $\Delta I$ (current margin), typically between 0.1 and 0.2 per unit rating. Finally, the master controller 15 includes a high gain D.C. amplifier 22 which is supplied with a resultant input signal proportional to the difference between an input from a D.C. current transformer 23, proportional to the line current, and a set input from a potentiometer 24, the ordered current being transmitted through a coding unit 25 to the local controllers 10, 13 through telecommunication links 26, 27, respectively.

In the normal steady state under constant current control with the rectifier A.C. voltage 3 higher than the invertor A.C. voltage 4, the system is arranged so that the amplifiers 16 and 18 are both operating under negative feedback, with the ordered current transmitted through both links 26, 27 and the D.C. line current all practically equal to the value I. Since the effective invertor current is reduced by $\Delta I$ by the voltage on terminal 20, however, the invertor does not control the line current under this condition.

Figure 2:
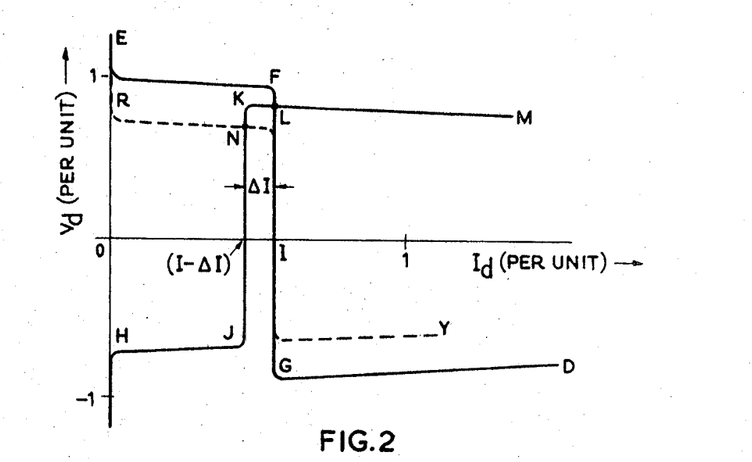
FIGURE 2 illustrates the rectifier and invertor characteristics under constant current control.

Referring now to FIGURE 2, the operation of the system will be described in the event of a change in the A.C. voltage 3 applied to the rectifier. This figure illustrates the characteristics of the rectifier and invertor under constant current control, the trace EFGD constituting the rectifier characteristic and the trace MKJH constituting the invertor characteristic, this latter characteristic having being reversed to allow for its reversed connections relative to the rectifier. The portions EF and GD indicate that the amplifier 16 associated with the rectifier is saturated in a positive or negative sense, and similarly the portions MK and HJ indicate that the amplifier 18 associated with the invertor is saturated.

The point L at which the two characteristics cross one another constitutes the 'working' point in the steady state, i.e. at a current value equal to the ordered current I.

Assuming now a fall in the A.C. voltage at the rectifier, the rectifier characteristic will fall as shown by the trace RY, and the working point will tend to fall to the point N resulting in a reduced D.C. current output tending towards $I-\Delta I$, with the invertor controlling current at the latter value. This decrease is however sensed by the transformer 23 and the master controller 15 responds in a manner such that, after a time delay due to the telecommunication links 26, 27 the current order signals tend to increase. The system will come to rest with the effective current order signals to the rectifier and invertor corresponding to $I+\Delta I$ and I, respectively; since the invertor is in control, the actual line current will be closely equal to I. This final condition corresponds to portions LG and KJ of the characteristics shown in FIGURE 2 being shifted to the right by a final amount $\Delta I$, the rectifier characteristics still lying on the dotted lines.

A similar action to that described occurs if the invertor A.C. voltage rises, and the converse action occurs if the rectifier A.C. voltage subsequently increases again, or if the invertor A.C. voltage similarly decreases. The D.C. line current is therefore held permanently at the value I except for brief excursions between the limits $I-\Delta I$ and $I+\Delta I$ as the relative A.C. voltages change. In practice, A.C. voltages mostly change rather slowly or in small jumps, so that the magnitude of the transient error will rarely exceed a small fraction of $\Delta I$.

Figure 3:
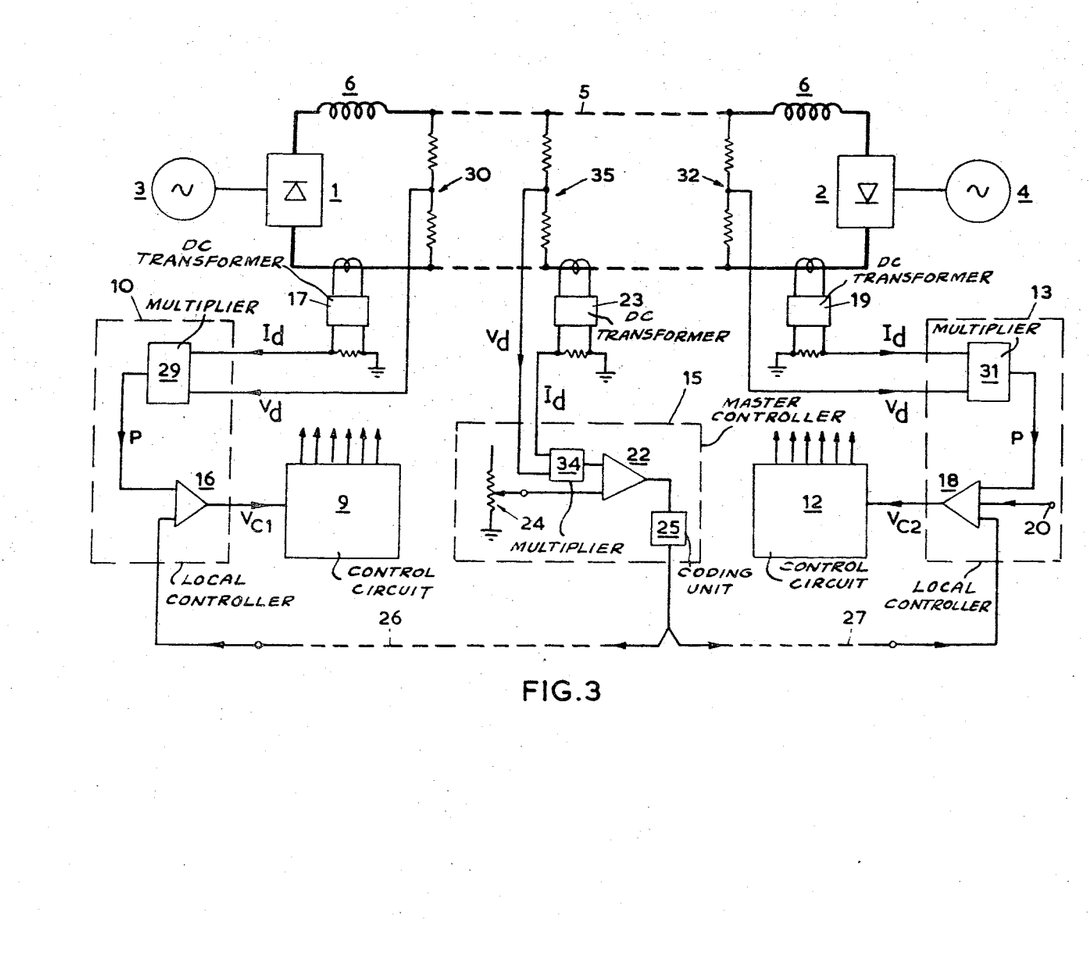
FIGURE 3 illustrates an H.V.D.C. link incorporating a "constant power" control system according to this invention.

Referring now to FIGURE 3 there is shown an H.V.D.C. link operating under constant power control. This figure is similar to FIGURE 1 except that multiplier circuits are included in the local and master controllers, these multipliers being, for example, of the mark-space or the Hall type. More particularly, the local controller 10 includes a multiplier circuit 29 which delivers to the amplifier 16 a voltage proportional to the instantaneous product of the current output from the D.C. transformer 17 and a proportion of the D.C. line voltage determined by a resistance voltage divider 30, and the local controller 13 includes a multiplier circuit 31 which delivers to the amplifier 18 a voltage proportional to the product of the current output from the D.C. transformer 19 and a proportion of the D.C. line voltage determined by a voltage divider 32. In addition, the amplifier 18 receives at its terminal 20 a voltage which effectively reduces the power order P obtained via the telecommunication link 27 by an amount $\Delta P$ per unit, this power order P being set by the master controller 15.

Figure 4:
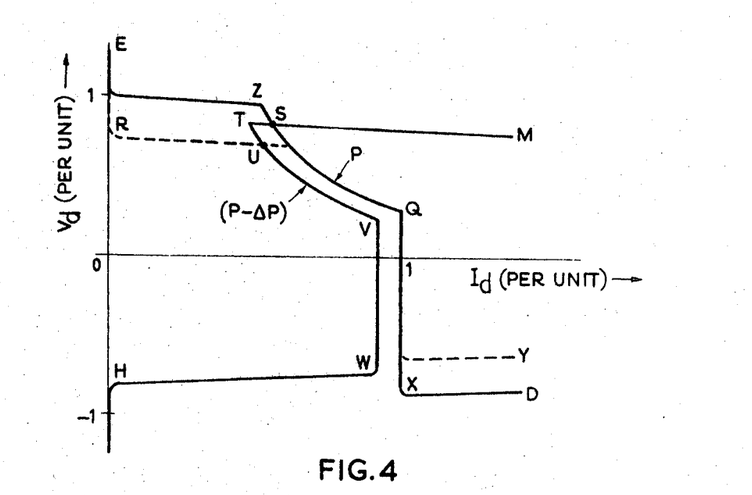
FIGURE 4 illustrates the rectifier and invertor characteristics under constant power control.

Furthermore, auxiliary negative feedback circuits (not shown) are included in both local controllers for the purpose of limiting the maximum current at the rectifier and invertor stations, e.g. unit current at the rectifier and 0.9 per unit current at the inverter, cf. FIGURE 4.

The master controller 15 includes a multiplier circuit 34 which delivers to the amplifier 22 a voltage proportional to the product of the current output from the D.C. transformer 23 and a proportion of the D.C. line voltage determined by a voltage divider 35, the amplifier 22 receiving a net input proportion by the difference between this "actual power" value and a "set power" set as a D.C. voltage by potentiometer 24.

Referring now to FIGURE 4, there are shown the characteristics of the rectifier and invertor under constant power control, the trace EZQXD constituting the rectifier characteristic and the trace MTVWH constituting the invertor characteristic. The portion ZQ of the trace is part of a rectangular hyperbola having the equation $V_d I_d = P$, and the portion TV of the trace is also part of a rectangular hyperbola but corresponding to a power $P-\Delta P$, the value $\Delta P$ being determined, as mentioned above, by the voltage on terminal 20 in the local controller 13.

Under normal conditions of operation, the working point would lie at 8 at S on the trace at a D.C. voltage determined by the invertor, close to the maximum rectifier voltage. Should the A.C. voltage at the rectifier now fall, the rectifier characteristic may fall to that defined by the trace RQY and the now working point will be defined by the pont U tending to give a reduced power output $P-\Delta P$. This reduction in power is however sensed by the master controller 15 which responds in a manner such as to increase the ordered power at both stations by the amount $\Delta P$ to give ordered powers of $P+\Delta P$ and P at the rectifier and invertor stations, respectively; since the invertor is controlling power, due to the A.C. voltage reduction at the rectifier, the actual power is again close to P. The master controller thus operates in a similar manner to that described with reference to constant current control, the power normally lying at the set value P except for brief transient changes of up to $\pm \Delta P$ due to relative variations in the two A.C. voltages 3 and 4. However, where there are large reductions in the A.C. voltages, e.g. due to "blocking" of one of two series-connected convertor bridges at one station, it may be impossible to maintain the set power without exceeding one of the values of maximum current permitted by the local controllers, and in this case the power will remain at the maximum (reduced) value permitted by this maximum current.

For cases such as these in which, with the power setting at the maximum permissible, the rectifier voltage is substantially lower than the invertor voltage a disadvantage arises in so far as the operation is now maintained at say, a point on the portion VW (FIGURE 4), and with current limit circuits at the rectifier and invertor stations set at 1.0 and 0.9 of the rated current (portions QX and VW) operation is only at 0.9 of the rated current.

Figure 5:
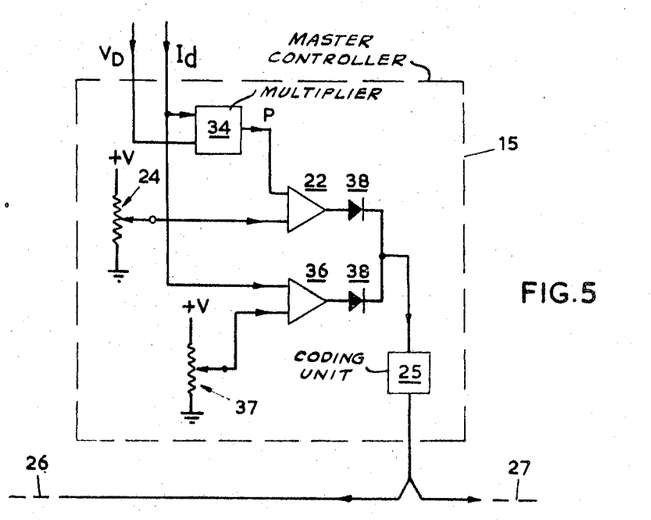
FIGURE 5 illustrates a modification of the master controller in the FIGURE 4 embodiment by which the full current rating may be maintained under certain conditions of operation.

Clearly this restriction is not necessary from a rating consideration, and in FIGURE 5 there is shown a modification imparted to the master controller 15 to avoid this drawback. This modification involves the introduction of a current-limiting amplifier 36 which is supplied by a nett input proportional to the difference between the actual line current derived from D.C. transformer 23 and the maximum rated current set as a proportional D.C. voltage on a potentiometer 37. A separate diode 38 is connected to the outputs from the two amplifiers 22 and 36 so as to ensure that the power order signal applied through the coding unit 25 to the telecommunication links 26, 27 is proportional to the smaller of the two amplifier output voltages. Accordingly, the amplifier 22 is normally in control wtih the amplifier 36 taking over control to limit the current only if the value demanded by the particular power setting should be greater than the current limit, say 1.0 per unit, set by the potentiometer 37, e.g. due to a low D.C. line voltage.

Thus, for the conditions given above, operation can be continued at the current limit of 1.0 per unit, i.e. full rating, by employing this modified circuit, with local current-limit settings at rectifier and invertor increased to values at least equal to this value, e.g. 1.1 and 1.0 per unit, respectively. The local current limit circuits would then not normally be effective, except under transient conditions or during faults such as telecommunication link failure.

Figure 6:
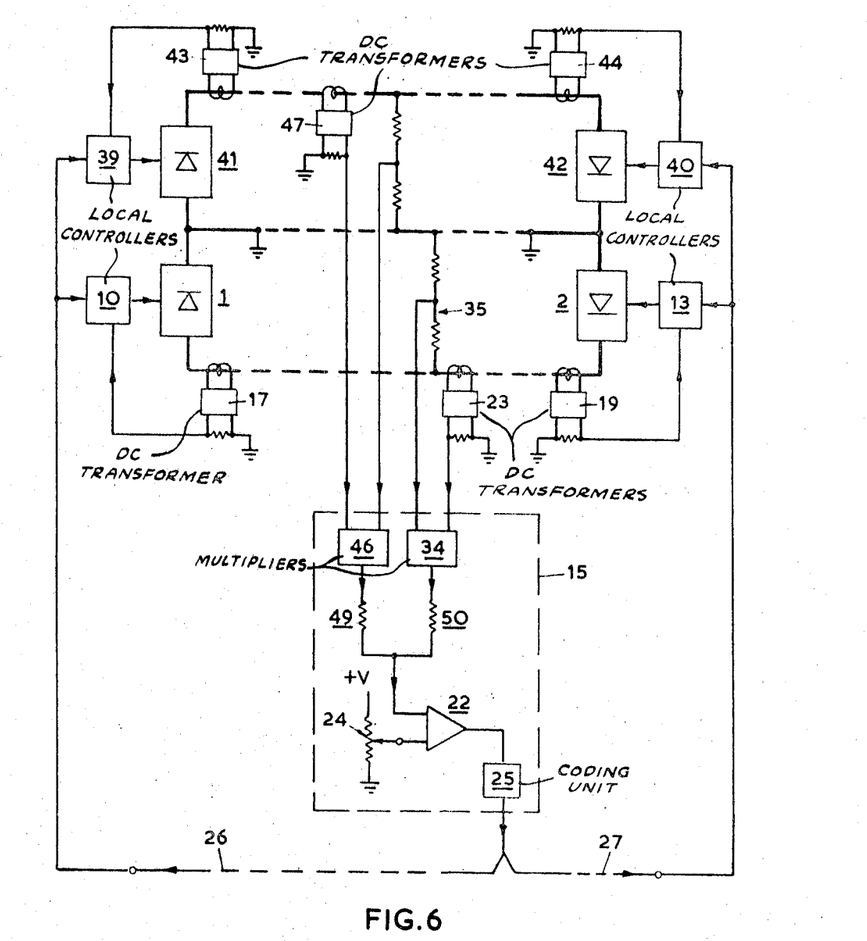
FIGURE 6 illustrates a bi-polar H.V.D.C. link in which the local controllers are under constant current control in dependence on the power monitored by the master controller.

FIGURE 6 shows a bi-polar H.V.D.C. link, this link being so designed that the local controllers are under current control as in the FIGURE 1 embodiment, the output from the master controller being a current order dependent on the total D.C. power of the two poles and on a set power.

More particularly, compared with FIGURE 1, additional local controllers 39, 40 are provided for convertors 41 (rectifier) and 42 (invertor), respectively, associated with a voltage proportional to line current determined by D.C. transformers 43, 44.

The master controller 15, however, is responsive to the power in one of the D.C. lines, similar to the FIGURE 3 embodiment and in addition to the multiplier 34, incorporates a further multiplier 46 having inputs proportional to the current and voltage on the other line via D.C. transformer 47 and a voltage divider 48. The outputs from the two multipliers 34 and 46 are therefore respectively proportional to the power in each main conductor and are applied to a common input terminal of the amplifier 22 through two equal value resistors 49, 50, respectively, the voltage at the input being proportional to the sum of the powers in each pole of the link i.e. the total power, and a set power determined by the potentiometer 24 is applied to the other input terminal. The resultant output is applied through telecommunication links 26, 27, as before, but both local controllers 10, 39 are supplied in common through the link 26 and both local controllers 13, 40 are supplied in common through the link 27.

Under normal conditions, this system tends to operate with the total power transmitted being proportional to the power order voltage set by the potentiometer 24, the currents in the two poles being equal, and the convertors accordingly sharing the available power equally between them. Now, in the event of a fault in one of the convertors, which is such as to reduce, but not eliminate, its voltage contribution, the system will operate asymmetrically with unequal voltages but where the available rectifier voltages exceed the available voltage at the corresponding invertors, the currents in each pole will remain equal, their magnitude however being increased by the control loop to maintain the same total power as before provided that this power value is not rendered unattainable by the current-limiting circuits. If, on the other hand, the D.C. voltage at a rectifier falls below that at its corresponding inverter, this power value tends to be maintained but the current in the faulty pole may be lower than that in the other pole by a value up to $\Delta I$, i.e. the current margin value, this difference current also flowing in the common earth return which normally carries zero current.

Figure 7:
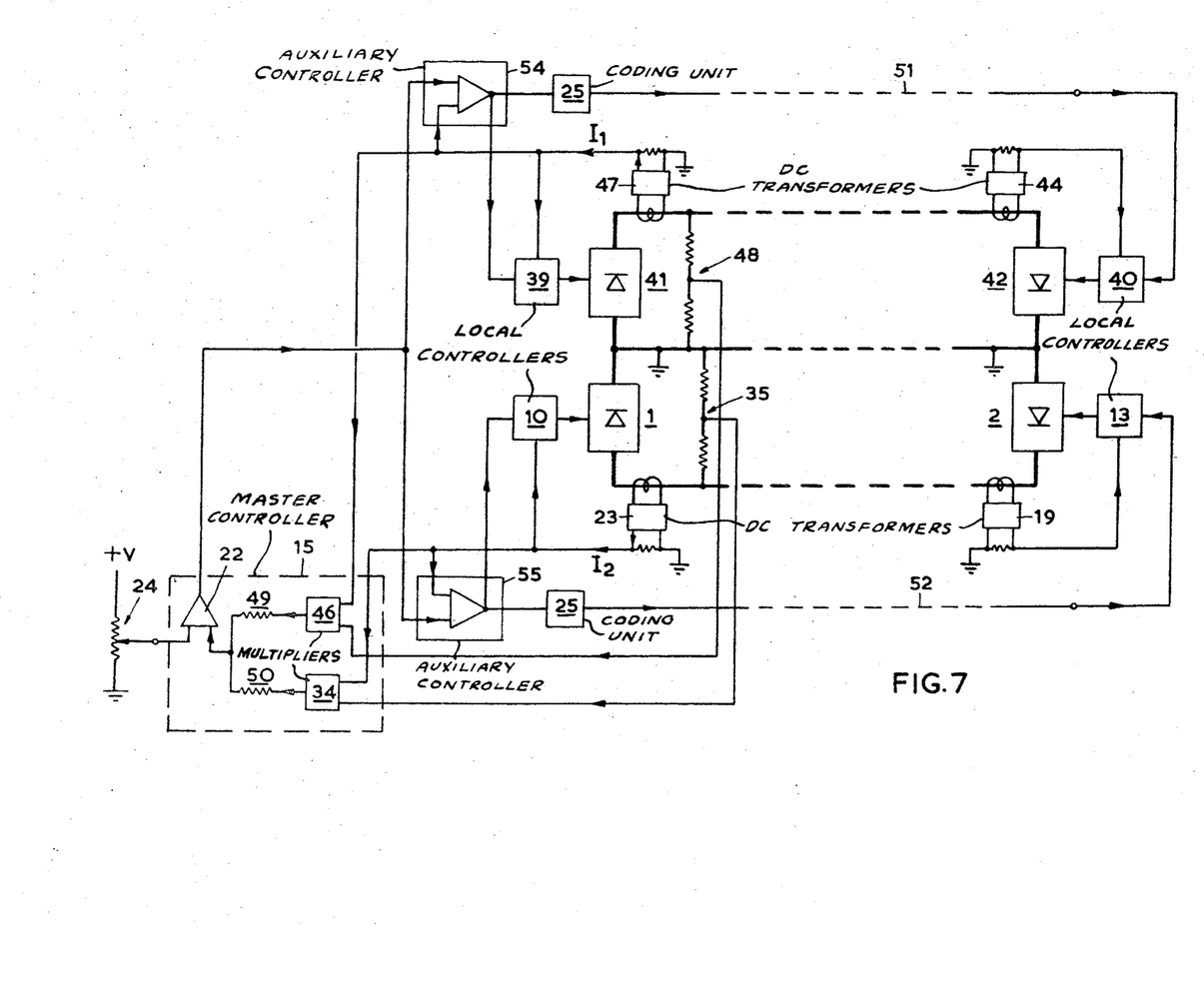
FIGURE 7 illustrates a modification of the control system for the bi-polar link shown in FIGURE 6 in which auxiliary controllers control the local controllers and are themselves responsive to a "main" current order from the master controller.

A circuit which is designed to avoid this possible flow of earth current is shown in FIGURE 7.

Referring now to this figure, the circuitry at the invertor station is the same as that shown in FIGURE 6 except that the local controllers 13, 40 are individually responsive to current order signals transmitted along telecommunication links 51, 52. The master controller 15 is situated at the rectifier station and operates in the same manner as described with reference to the preceding figure, but the current outputs from its associated D.C. transformers 23 and 47 are additionally fed to the local controllers 10 and 39, respectively, and to auxiliary master controllers 54, 55. In addition, these auxiliary controllers each receive the same current order signal from the master controller 15 and accordingly the output therefrom, which is applied to both the local controller and the telecommunication link associated therewith, is proportional to the difference between the actual line current and the "main" current order from the controller 15.

With this system, the master controller 15 adjusts the total power in proportion to the set value on potentiometer 24 whilst the auxiliary controllers 54, 55 tend to adjust each pole current to equality (i.e. zero earth current) in proportion to the "main" current order irrespective of whether the D.C. voltage is higher at the rectifier or the invertor. This restriction to zero earth current is maintained under all conditions except the complete loss of one pole.

In the circuit just described, the master controller 15 is, as mentioned above, situated at one of the converter stations and not at line centre as has been illustrated in the other embodiments, and it is to be understood that, in these latter embodiments, it is not necessary for the master controller to be situated at the position shown and indeed it will normally be more convenient to situate it at one of the stations, only one telecommunication link then being required.

Figure 8:
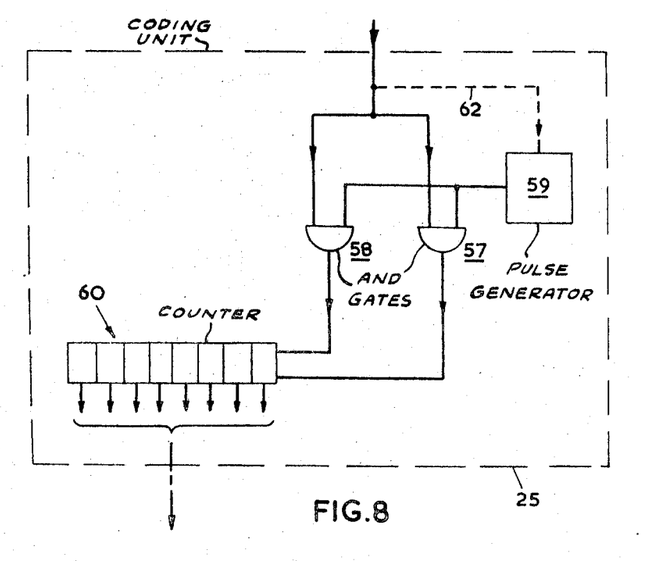
FIGURE 8 illustrates a particular form of coding unit employed at the master controller for transmitting information along a telecommunication link.

In each of the systems described the information transmitted along the telecommunication links may be in the form of a pulse-time multiplex, and the coding unit 25 may perform conventional analogue-to-digital conversion or it may conveniently be in the form shown in FIGURE 8 which is simpler in construction than the conventional convertor and does not require components of any great accuracy.

Referring now to this figure, the D.C. output from the amplifier in the master (or auxiliary) controller is fed in common to one input of each of two AND gates 57, 58, the other inputs of these gates being supplied with pulses from a free-running clock pulse generator 59. The gate 57 is so arranged that output pulses, at the pulse repetition frequency of the pulse generator, will only be produced if the input from the amplifier has a magnitude greater than a set level $V_1$, and similarly the gate 58 is so arranged that output pulses will only be produced if the input from the amplifier has a magnitude less than a set level $V_2$, where $V_1$ is greater than $V_2$ (conveniently equal in value but opposite in sign).

The output pulses from these two gates 57 and 58 are applied to separate inputs of a reversible binary counter 60, the pulses from the gate 57 increasing the counter order and the pulses from the gate 58 decreasing this order, and the resultant output from this counter is fed to the links 26, 27. The coding of the counter may, for example, be binary or binary-decimal, the voltage value possessed by its several stages indicating the state of these stages.

The clock pulse generator 59 may have a fixed pulse repetition frequency or it may be varied by a frequency control voltage from the amplifier via a path 62, the repetition frequency then being proportional to the magnitude of the output from the amplifier independent of its sign. In this case, with $V_1$ and $V_2$ being equal small values of positive and negative sign, respectively, the circuit operates substantially in the manner of an integrator, the binary number in the counter 60 changing at a rate proportional to the "error" output from the amplifier and remaining constant for zero "error."

Figure 9:
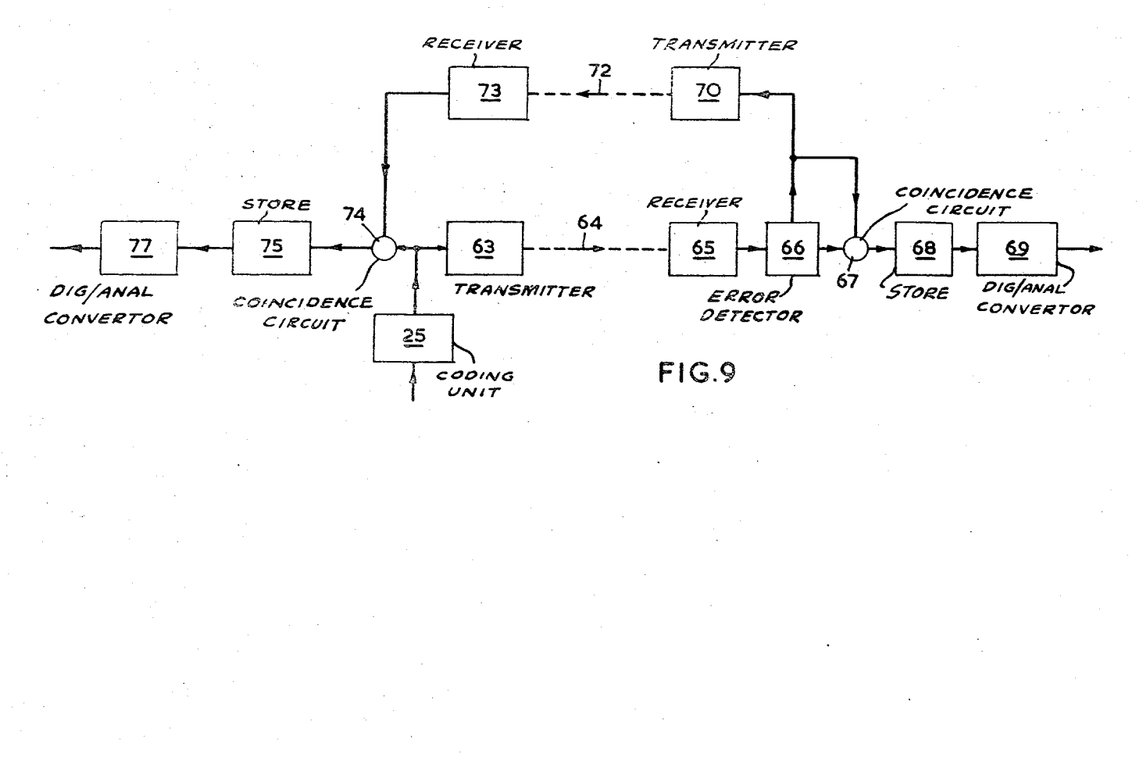
FIGURE 9 illustrates a block diagram of a typical telecommunication link employed.

A schematic circuit diagram of a typical telecommunication link employed with the master controller situated at the rectifier is shown in FIGURE 9. In this link, the output from the coding unit 25, i.e. the output from the counter 60 or from a digital storage device if a conventional analogue-to-digital convertor is employed, is transmitted as regular blocks of pulses by a unit 63 over a signal channel 64 to a receiver 65. From the receiver 65 the signals are applied to an error-checking circuit 66 and, if correct, are fed through a coincidence circuit 67 to a digital store 68 and thence to a digital-to-analogue convertor 69 for application to the local controller at the invertor.

The error-checking unit 66 is also designed to condition a pulse transmitter 70 whereby to transmit a signal back to the rectifier station over a "check" channel 72, a receiver 73 being adapted to actuate a further coincidence circuit 74 whereby to permit an output from the "storage" circuit in the coding unit 25 to be applied to a digital store 75. In turn, an output from this store is applied to a digital-to-analogue convertor 77 which feeds the local convertor at the rectifier.

Thus, if errors are detected by the circuit 66, e.g. due to channel failure or interference, then the digital stores 68 and 75 are left unchanged at their previous values until a correct signal arrives.

Essentially, the telecommunication links should be designed to provide an indefinitely long storage of the last order signals so that each convertor is held at the last correct received value in the event of errors, to ensure that these signals are free from errors due to interference, and to maintain the signals at closely equal values at all times.

In each of the systems described provision may be made for overcoming faults occurring in the control equipment or telecommunication link(s) by providing locally-set potentiometers (not shown) at each station by which any changes required in the current or power settings may be effected manually.

In addition, for cases in which the D.C. voltage and current supplied to the multipliers in the two stations are measured locally, as shown, then the output therefrom is proportional to power at the point of measurement and, due to the D.C. resistance of the line, the voltage may not be the same at the rectifier station as it is at the invertor station. Since it is preferable for the outputs from the multipliers at these two stations to be identical in the steady state their effective voltage inputs may be made identical by compounding to a common reference point on the line, making them equal to the sum of two components respectively proportional to local voltage and current, the current contribution being proportional to the D.C. line resistance up to the reference point.

The inputs to the multipliers in the master controllers may similarly be modified.

Further, as an alternative to controlling power in the embodiment described, the master controller may be arranged to control some other quantity, such as the frequency of the A.C. system, by replacing the feedback from the multiplier in the controller concerned by a D.C. voltage proportional to the desired quantity.

I claim:

1. A control system for an H.V.D.C. transmission link including two A.C.-D.C. converter stations each including controllable devices and operable as a rectifier and an invertor, respectively, comprising
   sensing means at each station for deriving from the link a first signal proportional to a first quantity thereof,
   a master controller common to the two stations, comprising
   monitoring means for deriving from said link a second signal proportional to a second quantity thereof,
   preset means for developing a third signal proportional to a desired value of said second quantity and
   first differential means connected to both the said monitoring and the said preset means for developing a fourth signal constituted by the difference between the second and third signals,
   a local controller at each station,
   transmission means for transmitting said fourth signal to the said local controllers, each local controller comprising
      (a) second differential means for developing a control signal constituted by the difference between said first signal from its associated sensing means and said fourth signal, and
      (b) a gating circuit controlled by said control signal for governing the conduction angles of said controllable devices whereby to adjust the said first quantity of the link in dependence on this signal, and
      control means connected to the second differential means for reducing said control signal at the invertor only, whereby to afford a margin by which the invertor tends to adjust the said first quantity to a value lower than that adjusted by the rectifier.

2. A control system according to claim 1, wherein the master controller comprises
   further preset means for developing a fifth signal proportional to the maximum rated value of the converter current, and
   limit means connected to both said first differential means and said further preset means for limiting the signal to the value of the fifth signal in response to the difference between the second and third signals attaining a value equivalent to the said maximum rated current.

3. A control system according to claim 1, wherein the first and second quantities are the same as, or different from, one another.

4. A control system according to claim 3, wherein the first and second quantities are the current or the power in the D.C. link.

5. A control system according to claim 3, wherein the second quantity is the frequency of the A.C. system at one of the convertor stations.

6. A control system for an H.V.D.C. transmission link including two A.C.-D.C. convertor stations each including controllable devices and operable as a rectifier and an invertor, respectively, comprising
- a local controller at each station for governing the conduction angles of said devices whereby to adjust a first quantity of the link,
- sensing means associated with each controller for deriving from the link a first signal proportional to said first quantity;
- a master controller situated at one of the convertor stations for deriving a second signal for said local controller,
- monitoring means associated with the master controller for deriving a third signal proportional to a second quantity and
- first preset means associated therewith for developing a fourth signal proportional to a desired value of said second quantity,
- second preset means associated therewith for developing a fifth signal proportional to the maximum rated value of the convertor current, the second signal being constituted by the difference between the third and fourth signals, and
- circuit means for limiting the second signal to the value of said fifth signal in response to the difference between the third and fourth signals attaining a value equivalent to the said maximum rated current,
- a telecommunication link for transmitting the said second signal to the other of the two convertor stations, and
- control means for reducing in value the said second signal at the invertor station only, whereby to afford a margin by which the invertor tends to adjust the first quantity to a value lower than that adjusted by the rectifier, the adjustment to the first quantity by the local controllers being effected in dependence on the difference between the said first and the said second signals.

7. A control system according to claim 6, comprising coding means for encoding the second signal as binary numbers, and
- a transmitter for transmitting the encoded signals along said telecommunication link in pulse-time multiplex.

8. A control system according to claim 7, wherein said coding means comprises,
- a reversible counter, and
- a clock pulse generator for adjusting the number held in said counter, the number increasing upon said second signals being greater than a predetermined value and decreasing upon these signals being less than said value.

9. A control system for a bi-polar H.V.D.C. transmission link including two A.C.-D.C. convertor stations each including controllable devices associated with each pole and operable as a rectifier and an invertor, respectively, comprising:
- two separate local controllers at each station for governing the conduction angles of the devices associated with the two corresponding poles whereby to adjust a first quantity of the link,
- sensing means associated with each controller for deriving from the link a first signal proportional to said first quantity,
- a master controller for deriving a common second signal for all the local controllers,
- monitoring means associated with the master controller for deriving a third signal proportional to a second quantity and
- preset means associated therewith for developing a fourth signal proportional to a desired value of said second quantity, the second signal being constituted by the difference between the third and fourth signals, and
- control means for reducing in value the said second signal at the invertor station only, whereby to afford a margin by which the invertor tends to adjust the first quantity to a value lower than that adjusted by the rectifier, the adjustment to the first quantity by the local controllers being effected in dependence on the difference between the said first and the said second signals.

10. A control system for a bi-polar H.V.D.C. transmission link including two A.C.-D.C. convertor stations operable as a rectifier and an invertor, respectively and each including controllable devices associated with each pole, comprising
- two separate local controllers at each station for governing the conduction angles of the devices associated with the two corresponding poles whereby to adjust a first quantity of the link,
- sensing means associated with each controller for deriving from the link a first signal proportional to said first quantity,
- a master controller for developing a second signal,
- monitoring means associated with the master controller for deriving a third signal proportional to a second quantity of pole of the link,
- first amplifying means for combining the corresponding third and first signals, and developing an output therefrom,
- preset means for developing a fourth signal proportional to a desired value of said first quantity, and
- second amplifying means responsive to both the output from the first amplifying means and the fourth signal to develop the said second signal,
- two auxiliary master controllers responsive to said first and second signals associated with each pole for developing fifth signals for the corresponding local controllers, the control exercised by said local controllers being dependent on the magnitude of both said fifth signals and said first signals derived from the link, and
- control means for reducing in value the said second signal at the invertor station only, whereby to afford a margin by which the invertor tends to adjust the first quantity to a value lower than than adjusted by the rectifier.

11. A control system according to claim 10, wherein the master and auxiliary master controllers are situated at one of the convertor stations, and comprising
- a telecommunication link for transmitting to the other convertor the said fifth signals from the corresponding auxiliary master controllers.

References Cited

UNITED STATES PATENTS

| | | | |
|---|---|---|---|
| 2,832,029 | 4/1958 | Forssell | 321—2 |
| 2,866,148 | 12/1958 | Forssell | 321—2 |
| 3,275,838 | 9/1966 | Almström | 321—2 X |
| 3,339,083 | 8/1967 | Uhlman | 321—2 X |

JOHN F. COUCH, Primary Examiner

W. H. BEHA, Jr., Assistant Examiner

U.S. Cl. X.R.

321—19, 27